United States Patent
Nakano et al.

(10) Patent No.: US 10,027,100 B1
(45) Date of Patent: Jul. 17, 2018

(54) ELECTRICAL CONNECTION BOX AND WIRE HARNESS

(71) Applicant: Yazaki Corporation, Tokyo (JP)

(72) Inventors: Ryo Nakano, Shizuoka (JP); Yukihiro Koyama, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/893,808

(22) Filed: Feb. 12, 2018

(30) Foreign Application Priority Data

Mar. 9, 2017 (JP) .................. 2017/045009

(51) Int. Cl.
 *B60R 16/023* (2006.01)
 *H02G 3/08* (2006.01)
 *B60R 16/02* (2006.01)
 *H01B 7/00* (2006.01)

(52) U.S. Cl.
 CPC ......... *H02G 3/083* (2013.01); *B60R 16/0239* (2013.01); *B60R 16/0215* (2013.01); *H01B 7/0045* (2013.01)

(58) Field of Classification Search
 CPC .................. B60R 16/0239; B60R 16/0215
 See application file for complete search history.

(56) References Cited

U.S. PATENT DOCUMENTS

| | | | | |
|---|---|---|---|---|
| 5,608,611 A * | 3/1997 | Szudarek | ............ | B60R 16/0239 174/138 G |
| 5,761,038 A * | 6/1998 | Tanaka | ................ | B60R 16/0239 174/15.2 |
| 6,121,548 A * | 9/2000 | Matsuoka | ........... | B60R 16/0239 174/59 |
| 2004/0080923 A1* | 4/2004 | Janisch | ............... | B60R 16/0239 361/826 |
| 2007/0049090 A1* | 3/2007 | Kaneko | ............... | B60R 16/0239 439/271 |
| 2008/0053699 A1* | 3/2008 | Nakayama | .......... | B60R 16/0239 174/532 |
| 2012/0000686 A1* | 1/2012 | Soh | ..................... | B60R 16/0238 174/50 |
| 2014/0027148 A1* | 1/2014 | Takeuchi | ............ | B60R 16/0238 174/68.3 |
| 2015/0092384 A1* | 4/2015 | Miyazaki | ............ | B60R 16/0239 361/807 |

(Continued)

FOREIGN PATENT DOCUMENTS

JP 2011-125173 A 6/2011

*Primary Examiner* — Hung V Ngo

(74) *Attorney, Agent, or Firm* — Sughrue Mion, PLLC

(57) ABSTRACT

An electrical connection box and a wire harness is provided with a casing including: a frame and an upper cover that are assembled to each other and that define a housing space portion; and insertion ports that are formed by opening a boundary edge of the frame or the upper cover to cause a conductive wiring material to be inserted through each of the insertion ports. The frame includes a pair of holding pieces that are provided on both sides of the insertion ports, the pair of holding pieces having flexibility in a clipping direction, and clipping and holding the wiring material. The upper cover includes a supporting projection rib that supports the pair of holding pieces at the side opposite from the wiring material, while the frame and the upper cover are assembled to each other.

5 Claims, 6 Drawing Sheets

(56) References Cited

U.S. PATENT DOCUMENTS

| | | | | |
|---|---|---|---|---|
| 2015/0303669 A1* | 10/2015 | Maebashi | ............ | H05K 5/0052 174/68.2 |
| 2016/0134046 A1* | 5/2016 | Furuzawa | ........... | B60R 16/0239 439/893 |
| 2017/0346266 A1* | 11/2017 | Matsui | ................... | H02G 3/083 |

* cited by examiner

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2017-045009 filed in Japan on Mar. 9, 2017.

BACKGROUND OF THE INVENTION

1. Field of the Invention

The present invention relates to an electrical connection box and a wire harness.

2. Description of the Related Art

Conventionally, an electrical connection box (may also be referred to as a junction box, a fuse box, a relay box, and the like) is mounted on a vehicle, and integrates and houses components used for connection processing such as a wire harness, and various electronic component modules such as electrical equipment including a fuse, a relay, an electronic control unit, and the like in the internal space (for example, Japanese Patent Application Laid-open No. 2011-125173).

For example, a casing of an electrical connection box includes a frame and an upper cover that define the internal space. Moreover, the casing sometimes includes an insertion port that is formed by opening the boundary edge of the frame or the upper cover to cause a wiring material to be inserted from the insertion port. In this case, in the electrical connection box, the wiring material needs to be held at the insertion port, and there is room for further improvement in this aspect.

SUMMARY OF THE INVENTION

The present invention has been made in view of the above and an object of the present invention is to provide an electrical connection box and a wire harness capable of suitably holding the wiring material.

In order to solve the above mentioned problem and achieve the object, an electrical connection box according to one aspect of the present invention includes a casing that includes: a first member and a second member that are assembled to each other and that define an internal space; and an insertion port formed by opening a boundary edge of at least one of the first member and the second member to cause a wiring material having conductivity to be inserted through the insertion port, wherein one of the first member and the second member includes a pair of holding pieces that are provided on both sides of the insertion port, the pair of holding pieces having flexibility in a clipping direction, and clipping and holding the wiring material, and the other of the first member and the second member includes a supporting projection part that supports the pair of holding pieces at a side opposite from the wiring material, while the first member and the second member are assembled to each other.

According to another aspect of the present invention, in the electrical connection box, it is preferable that the supporting projection part is a plate member that is provided inside the casing and that faces a wall surface on which the insertion port is provided.

According to still another aspect of the present invention, in the electrical connection box, it is preferable that a covering material that covers the wiring material when the wiring material is inserted into the covering material, wherein the pair of holding pieces clip and hold the covering material from both sides thereof.

A wire harness according to still another aspect of the present invention includes a wiring material that is conductive; and an electrical connection box electrically connected to the wiring material, wherein the electrical connection box includes a casing including a first member and a second member that are assembled to each other and that define an internal space, and an insertion port that is formed by opening at least one of a boundary edge of the first member and the second member to cause a wiring material that is conductive to be inserted through the insertion port, one of the first member and the second member includes a pair of holding pieces that are provided on both sides of the insertion port, the pair of holding pieces having flexibility in a clipping direction, and clipping and holding the wiring material, and the other of the first member and the second member includes a supporting projection part that supports the pair of holding pieces at a side opposite from the wiring material, while the first member and the second member are assemble to each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (embodiment) will now be described in detail with reference to the accompanying drawings. The present invention is not limited to the contents described in the following embodiment. Moreover, components described below include those that can be easily assumed by a person skilled in the art, and those that are substantially the same. Furthermore, the components described below may be combined with one another as appropriate. Still furthermore, various omissions, substitutions, or changes of the components may be made without departing from the spirit of the present invention.

Embodiment

An electrical connection box 1 and a wire harness WH according to an embodiment will now be described. In the following explanation, in a first direction, a second direction, and a third direction intersecting one another, the first direction is referred to as a "height direction X", the second direction is referred to as a "first width direction Y", and the third direction is referred to as a "second width direction Z". In this example, the height direction X, the first width direction Y, and the second width direction Z are orthogonal with one another. Typically, during the manufacturing stage of a vehicle, which is not illustrated, or while the electrical connection box 1 is mounted on a vehicle and the vehicle is positioned on a horizontal plane, the height direction X is set along the vertical direction, and the first width direction Y and the second width direction Z are set along the horizontal direction. In the following explanation, the side where an upper cover 33, which will be described below, is provided in the height direction X may be referred to as the upper side, and the side where a lower cover 32, which will be described below, is provided may be referred to as the lower side. Unless otherwise specified, directions used in the following description are explained under the assumption that units are assembled to each other, and the electrical connection box 1 is mounted on the vehicle.

Figure 1:
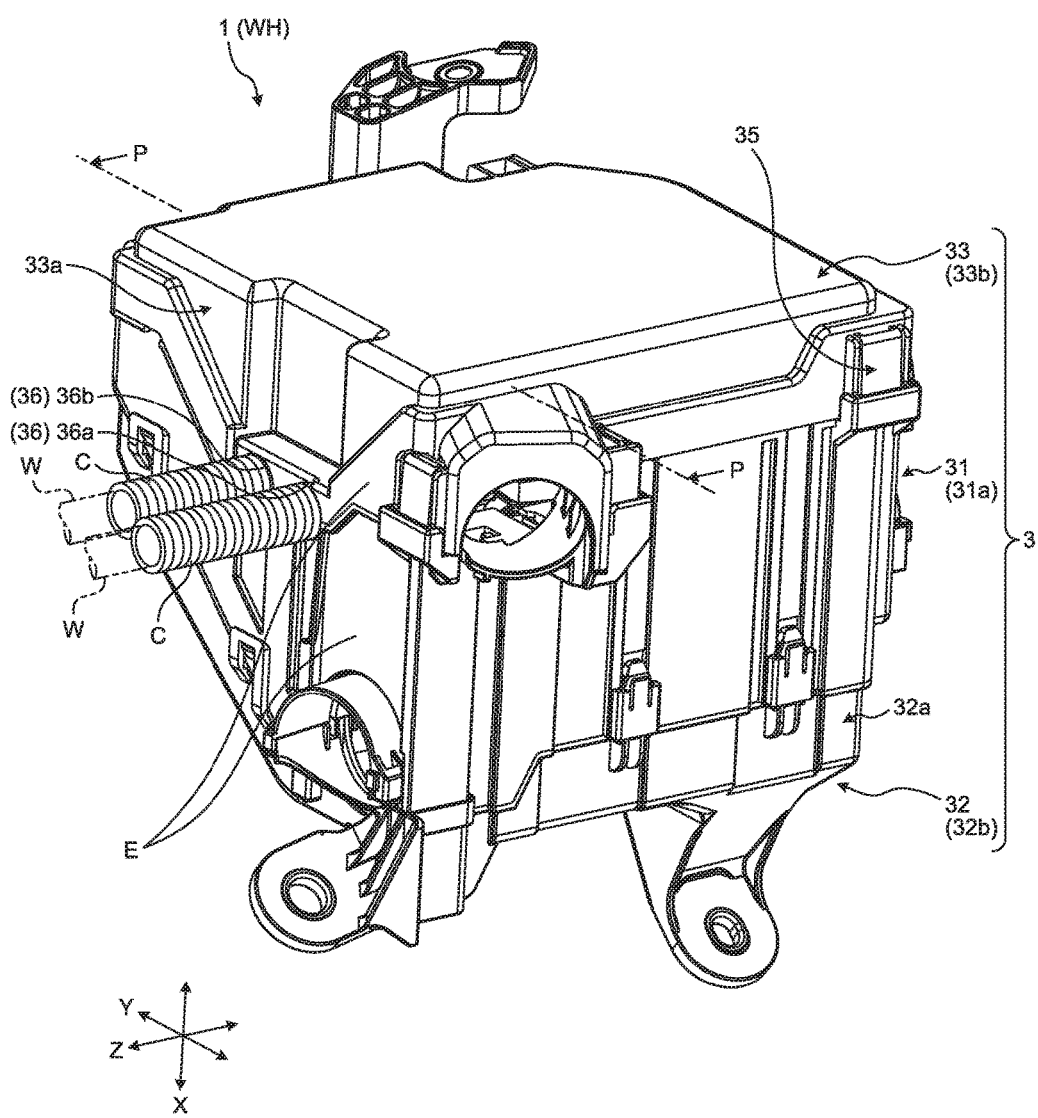
FIG. 1 is a perspective view illustrating a configuration example of an electrical connection box according to an embodiment.
Figure 2:
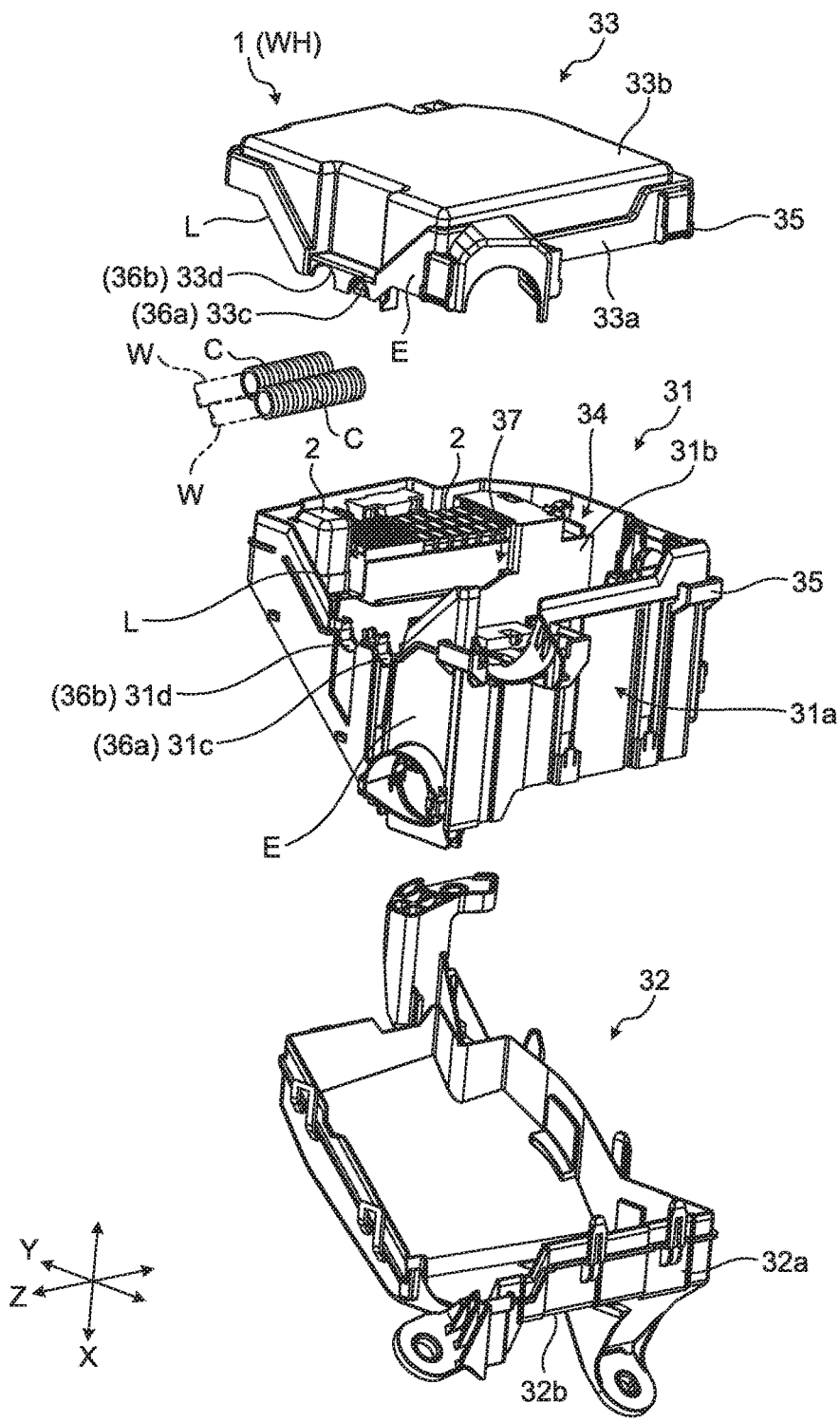
FIG. 2 is an exploded perspective view illustrating a configuration example of the electrical connection box according to the embodiment.

The electrical connection box 1 according to the present embodiment illustrated in FIG. 1 and FIG. 2 is mounted on a vehicle such as an automobile, and is embedded into the wire harness WH. For example, the wire harness WH is an assembly in which a plurality of wiring materials W used for supplying power and signal communication are bundled to connect devices mounted on a vehicle together. The wire harness WH connects the wiring materials W with the devices through a connector and the like. The wire harness WH includes the wiring materials W that are conductive, a corrugated tube C that is a covering material into which the wiring materials W are inserted, and the electrical connection box 1 that is electrically connected to the wiring materials W. For example, the wiring materials W include a metal rod, an electric wire, an electric wire bundle, and the like. The metal rod is obtained by covering the outside of a conductive rod-shaped member with an insulating covering part. The electric wire is obtained by covering the outside of a conductor part (core wire) made of a plurality of conductive metal strands with an insulating covering part. The electric wire bundle is obtained by bundling the electric wires.

The corrugated tube C is formed in a tubular shape (pipe shape), in this example, in a cylindrical shape having flexibility, using an insulating resin material. The corrugated tube C has ring-shaped concave and convex portions formed on the outer surface of the corrugated tube C along the circumference direction and thus forms a bellows shape. A plurality of the concave and convex portions are provided in the extending direction (axis direction). The corrugated tube C covers the wiring material W when the wiring material W is inserted thereinto. The corrugated tube C covers and protects the outer peripheral side of the wiring material W. A slit from which the wiring material W is inserted into the corrugated tube C may also be formed on the corrugated tube C along the extending direction. The wire harness WH bundles and collects the wiring materials W, and causes the electrical connection box 1 to be electrically connected thereto via a terminal provided on the end of the bundled wiring materials W, a connector, and the like. The wire harness WH may also include a grommet, a protector, a fixing tool, and the like.

The electrical connection box 1 integrates electrical equipment such as a connector, a fuse, a relay, a capacitor, a branching unit, and an electronic control unit, and stores therein the electrical equipment such as the connector, the fuse, the relay, the capacitor, the branching unit, and the electronic control unit. The electrical connection box 1 is connected between a power source and various electronic devices mounted inside a vehicle, via the wiring materials W and the like. The electrical connection box 1 distributes the power supplied from the power source to the various electronic devices in the vehicle. The electrical connection box 1 may also be referred to as a junction box, a fuse box, a relay box, and the like, but in the present embodiment, the junction box, the fuse box, the relay box, and the like are collectively referred to as an electrical connection box.

The electrical connection box 1 includes an electronic component 2 and a casing 3. The electronic component 2 is housed inside the casing 3, and electrically connected to the wiring material W. The electronic component 2 is provided in plurality. For example, the electronic components 2 include a connector, a fuse, a relay, a capacitor, a branching unit, an electronic control unit, an electronic component unit in which the connector, the fuse, the relay, the capacitor, the branching unit, and the electronic control unit are unitized, and the like.

The casing 3 houses the electronic components 2 in a housing space portion 34 that is an internal space formed inside the casing 3. The casing 3 includes a frame 31 that is a first member, the lower cover 32 that is a bottom member, and the upper cover 33 that is a second member. The casing 3 is overall formed in a hollow box shape by assembling the frame 31, the lower cover 32, and the upper cover 33 together. The casing 3 has a three-layer divided structure divided into the frame 31, the lower cover 32, and the upper cover 33. The frame 31, the lower cover 32, and the upper cover 33 are made of insulating synthetic resin.

The frame 31 is the main member to form the housing space portion 34. The frame 31 has a cylindrical frame shape and has openings on two surfaces facing each other in the height direction X. The frame 31 is formed in a hollow shape by a side wall surface 31$a$ that is a main body side wall surface. The side wall surface 31$a$ is a wall body forming the housing space portion 34. The side wall surface 31$a$ is formed in a polygonal tube shape (substantially rectangular tube shape), and is opened to both sides in the height direction X. The frame 31 includes a plurality of partition boards 31$b$ inside the side wall surface 31$a$, and the partition boards 31$b$ subdivide the housing space portion 34. For example, each of the partition boards 31$b$ is provided inside the side wall surface 31$a$ along the second width direction Z, and partitions the housing space portion 34 into substantially half.

The lower cover 32 is a member having a dish shape (tray shape) that covers the lower opening of the frame 31 in the height direction X. The lower cover 32 is formed in a hollow shape by a side wall surface 32$a$ that is a bottom member side wall surface, and a bottom surface 32$b$. The side wall surface 32$a$ is a wall body formed in a polygonal tube shape (substantially rectangular tube shape). The bottom surface 32$b$ is a bottom body that covers one of the openings of the side wall surface 32$a$ (lower opening in the height direction X). The upper cover 33 is a member having a lid shape that covers the upper opening of the frame 31 in the height direction X. The upper cover 33 is formed in a hollow shape by a side wall surface 33a that is a lid member side wall surface, and a ceiling surface 33b. The side wall surface 33a is a wall body formed in a polygonal tube shape (substantially rectangular tube shape). The ceiling surface 33b is a ceiling body that covers one of the openings of the side wall surface 33a (upper opening in the height direction X).

The casing 3 is positioned so that the lower opening of the frame 31 in the height direction X and the opening of the lower cover 32 can face each other, and the upper opening of the frame 31 in the height direction X and the opening of the upper cover 33 can face each other. In the casing 3, the lower cover 32 is assembled to the lower side of the frame 31 in the height direction X, and the upper cover 33 is assemble to the upper side of the frame 31 in the height direction X. The casing 3 includes various types of locking mechanisms 35, and the upper cover 33 and the lower cover 32 are locked to the frame 31 through the various types of locking mechanisms 35. As a whole, the casing 3 is formed in a substantially rectangular parallelepiped shape in which the direction along the first width direction Y is the short side, and the direction along the second width direction Z is the long side. With this configuration, the casing 3 includes the housing space portion 34 that is defined by the frame 31, the lower cover 32, and the upper cover 33.

The casing 3 also includes a plurality of insertion ports 36 (36a and 36b). The wiring material W covered with the corrugated tube C (hereinafter, may be simply referred to as the "wiring material W") is inserted into the casing 3 through each of the insertion ports 36. Thus, the casing 3 is electrically connected to the electronic components 2. Each of the insertion ports 36 is opened corresponding to the exterior shape of the corrugated tube C to be inserted. For example, the insertion port 36 is formed by opening a boundary edge L of the frame 31 or the upper cover 33. For example, the insertion port 36a has a lower semicircular opening portion 31c having a semicircular shape on the edge of the opening, at the upper opening of the frame 31 in the height direction X. The insertion port 36a also has an upper semicircular opening portion 33c having a semicircular shape on the edge of the opening of the upper cover 33, at the position facing the lower semicircular opening portion 31c. In this manner, an insertion opening portion that has a substantially circular shape, and that is formed by assembling the lower semicircular opening portion 31c and the upper semicircular opening portion 33c to each other is formed on the insertion port 36a, while the upper cover 33 is assembled to the upper side of the frame 31 in the height direction X. The wiring material W is then inserted into the insertion opening portion of the insertion port 36a. The insertion port 36b is provided side by side with the insertion port 36a in the first width direction Y. The insertion port 36b includes a lower semicircular opening portion 31d and an upper semicircular opening portion 33d, and is formed similar to the insertion port 36a.

The housing space portion 34 is a space defined by the frame 31, the lower cover 32, and the upper cover 33, that is, a space surrounded by the frame 31, the lower cover 32, and the upper cover 33. The housing space portion 34 houses therein the electronic components 2. The housing space portion 34 is defined by the side wall surface 31a of the frame 31, the side wall surface 32a of the lower cover 32, and the side wall surface 33a of the upper cover 33, relative to the first width direction Y and the second width direction Z. Moreover, the lower side of the housing space portion 34 in the height direction X is defined by the bottom surface 32b of the lower cover 32, and the upper side of the housing space portion 34 in the height direction X is defined by the ceiling surface 33b of the upper cover 33. A block 37 is provided inside the housing space portion 34 in the electrical connection box 1. The block 37 is detachably assembled to the frame 31 through the various types of locking mechanisms. Similar to the frame 31 and the like, the block 37 is made of insulating synthetic resin. The block 37 may also be divided into a plurality of blocks. A large number of cavities are formed on the block 37 as connecting portions. The electronic component 2 is assembled in each of the cavities. Moreover, a circuit body made of a conductive metal material is assembled to the block 37. The circuit body electrically connects the electronic components 2 assembled in the cavities with the wiring materials W to form a part of an electric circuit. For example, the circuit body is a bus bar and the like. In the block 37, a terminal provided on the end of the wiring material W that is routed through the insertion port 36 and the like is inserted and fitted into each of the cavities. Furthermore, in the block 37, each of the electronic components 2 is inserted and fitted into each of the cavities from the upper side in the height direction X. With this configuration, the electronic components 2 and the wiring materials W are electrically connected to each other through the circuit body such as the bus bar, while the electronic components 2 and the wiring materials W are assembled and mounted on the block 37. Consequently, it is possible to configure a desired electric circuit.

Figure 3:
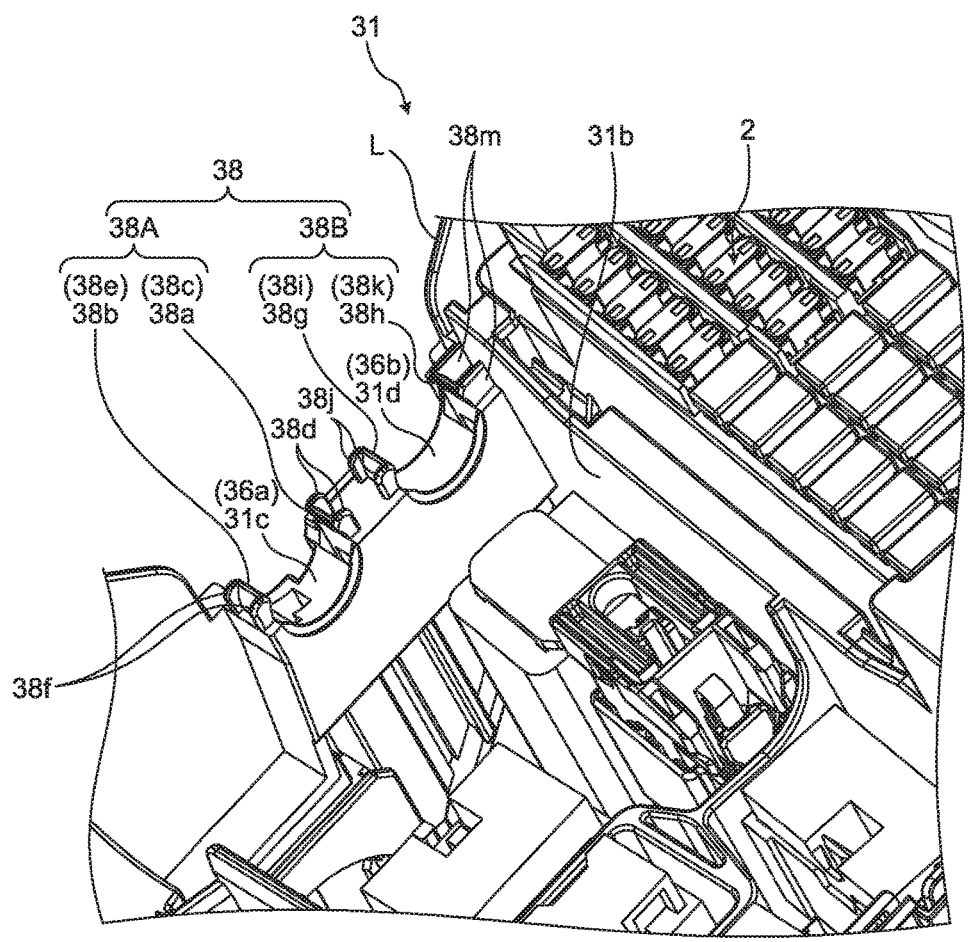
FIG. 3 is a perspective view illustrating a configuration example of a pair of holding pieces according to the embodiment.
Figure 4:
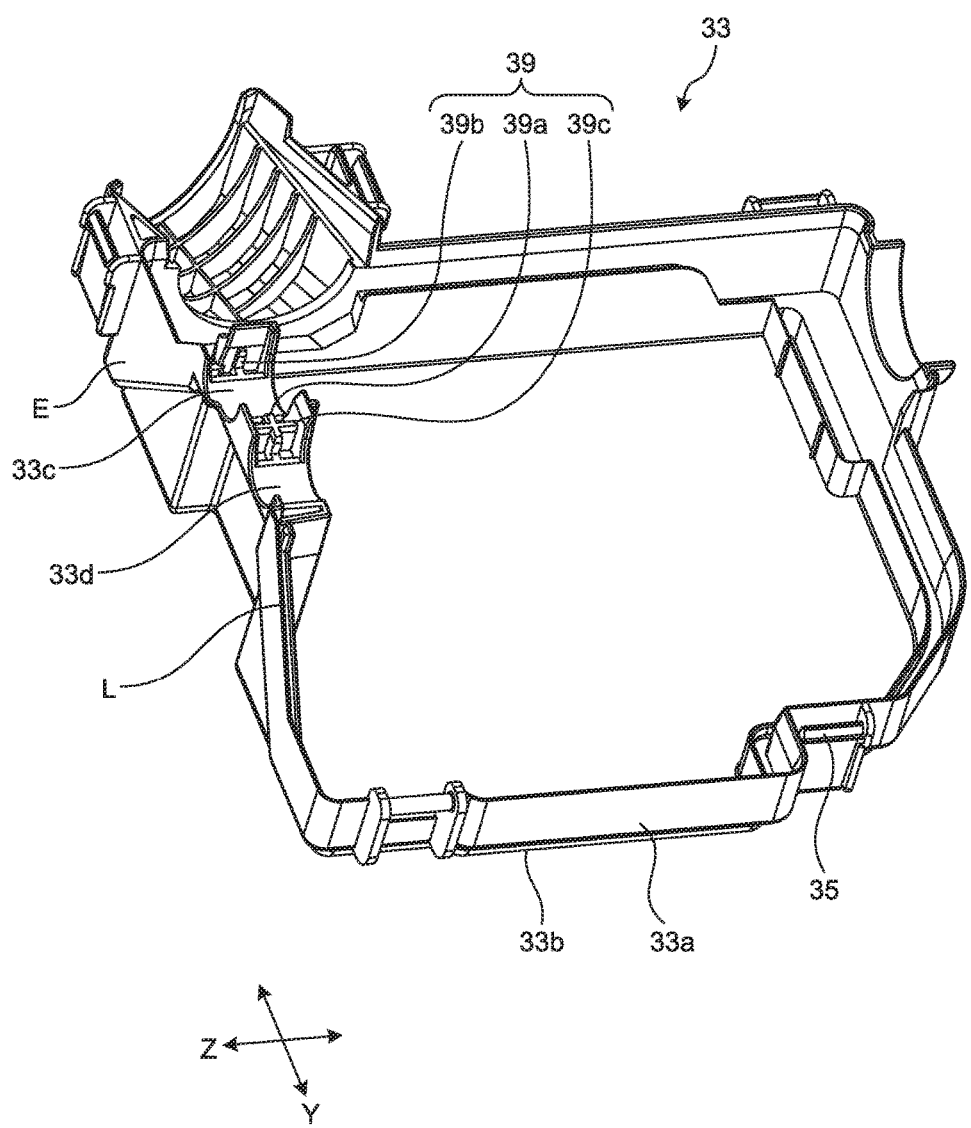
FIG. 4 is a perspective view illustrating a configuration example of an upper cover according to the embodiment.
Figure 5:
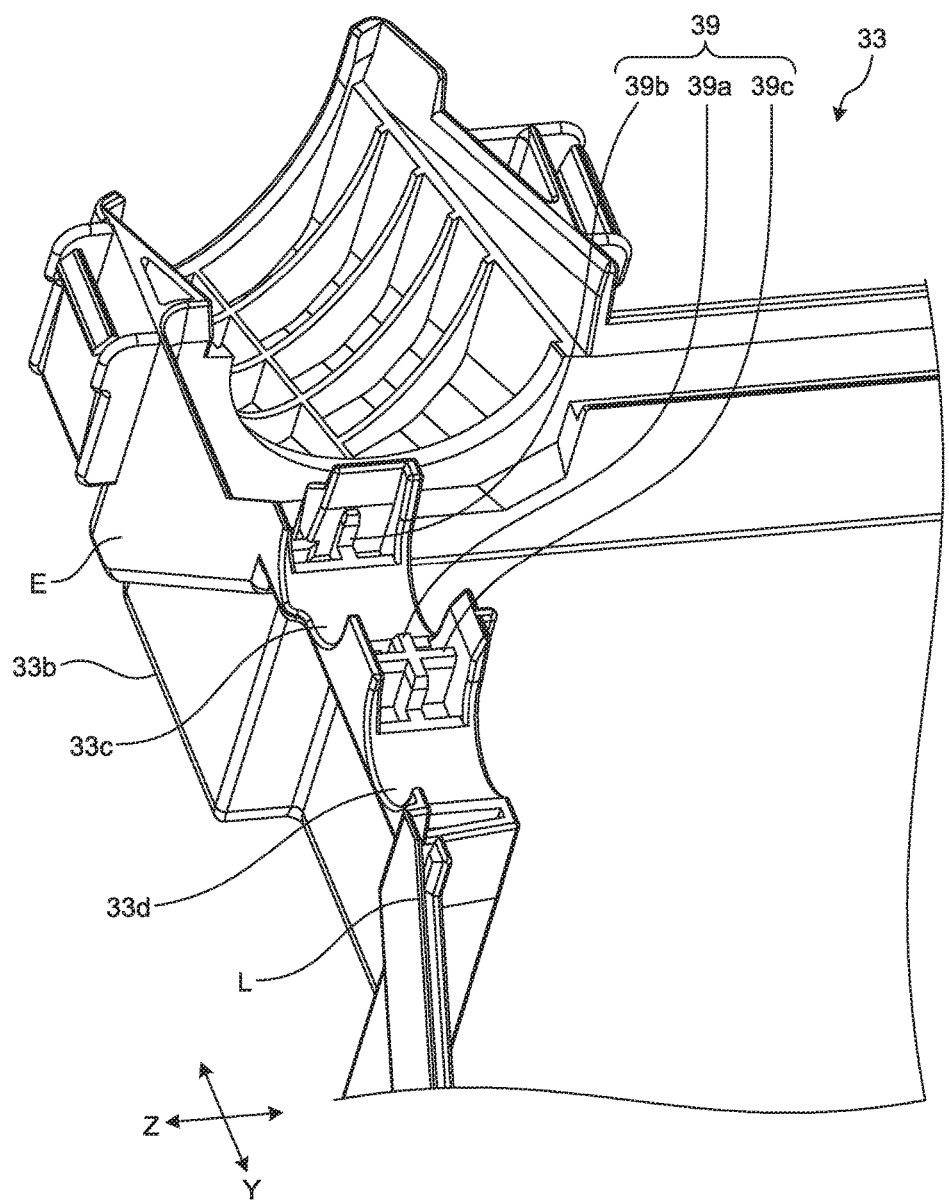
FIG. 5 is a perspective view illustrating a configuration example of a supporting projection part according to the embodiment.

As illustrated in FIG. 3, FIG. 4, and FIG. 5, the casing 3 of the electrical connection box 1 of the present embodiment further includes a holding unit 38 and a supporting projection rib 39 that is a supporting projection part. The holding unit 38 is a member for holding the wiring material W that is inserted into the insertion port 36, and includes a plurality of pairs of holding pieces 38A and 38B (see FIG. 3). The pair of holding pieces 38A have flexibility in the clipping direction (first width direction Y), and clip and hold the wiring materials W, respectively. The pair of holding pieces 38A include a first holding piece 38a and a second holding piece 38b. The first holding piece 38a and the second holding piece 38b are provided on both sides of the insertion port 36a, facing each other in the first width direction Y with the insertion port 36a interposed therebetween. The first holding piece 38a stands upright on an end of one side of the lower semicircular opening portion 31c that forms the insertion port 36a, in the first width direction Y. For example, the first holding piece 38a includes a holding surface plate 38c that holds a part of the outer peripheral surface of the wiring material W covered with the corrugated tube C, and a reinforcing piece 38d that reinforces the holding surface plate 38c. The holding surface plate 38c is a plate-shaped member that is curvedly formed along the shape of the outer peripheral surface of the corrugated tube C. The reinforcing piece 38d is provided on both ends of the holding surface plate 38c in the second width direction Z, and supports the holding surface plate 38c from the side opposite from the wiring material W. The reinforcing piece 38d supports the holding surface plate 38c so that the holding surface plate 38c can bend, when the holding surface plate 38c holds the wiring material W.

The second holding piece 38b stands upright on the end of the other side of the lower semicircular opening portion 31c in the first width direction Y. The second holding piece 38b is formed similar to the first holding piece 38a. In other words, for example, the second holding piece 38b includes a holding surface plate 38e that holds a part of the outer peripheral surface of the wiring material W covered with the corrugated tube C, and a reinforcing piece 38f that reinforces the holding surface plate 38e. The holding surface plate 38e is a plate-shaped member that is curvedly formed along the shape of the outer peripheral surface of the corrugated tube C. The reinforcing piece 38*f* is provided on both ends of the holding surface plate 38*e* in the second width direction Z, and supports the holding surface plate 38*e* from the side opposite from the wiring material W. The reinforcing piece 38*f* supports the holding surface plate 38*e* so that the holding surface plate 38*e* can bend, when the holding surface plate 38*e* is holding the wiring material W.

With the pair of holding pieces 38A configured in this manner, the interval between the tip end portion of the first holding piece 38*a* and the tip end portion of the second holding piece 38*b* is set narrower than the diameter of the corrugated tube C (initial state). Consequently, with the pair of holding pieces 38A, when the wiring material W is pressed in between the first holding piece 38*a* and the second holding piece 38*b*, the first holding piece 38*a* and the second holding piece 38*b* bend in a direction separating from each other. When the wiring material W is further pressed to the lower semicircular opening portion 31*c*, the first holding piece 38*a* and the second holding piece 38*b* return to the initial state.

The pair of holding pieces 38B are formed similar to the pair of holding pieces 38A. The pair of holding pieces 38B have flexibility in the clipping direction, and clip and hold the wiring material W. The pair of holding pieces 38B include a first holding piece 38*g* and a second holding piece 38*h*. The first holding piece 38*g* and the second holding piece 38*h* are provided on both sides of the insertion port 36*b*, and facing each other in the first width direction Y with the insertion port 36*b* interposed therebetween. The first holding piece 38*g* stands upright on an end of one side of the lower semicircular opening portion 31*d* forming the insertion port 36*b*, in the first width direction Y. For example, the first holding piece 38*g* includes a holding surface plate 38*i* that holds a part of the outer peripheral surface of the wiring material W covered with the corrugated tube C, and a reinforcing piece 38*j* that reinforces the holding surface plate 38*i*. The holding surface plate 38*i* is a plate-shaped member that is curvedly formed along the shape of the outer peripheral surface of the corrugated tube C. The reinforcing piece 38*j* is provided on both ends of the holding surface plate 38*i* in the second width direction Z, and supports the holding surface plate 38*i* from the side opposite from the wiring material W. The reinforcing piece 38*j* supports the holding surface plate 38*i* so that the holding surface plate 38*i* can bend, when the holding surface plate 38*i* is holding the wiring material W.

The second holding piece 38*h* stands upright on the end of the other side of the lower semicircular opening portion 31*d* in the first width direction Y. The second holding piece 38*h* is formed similar to the first holding piece 38*g*. However, because the second holding piece 38*h* is fixed to the partition board 31*b*, the second holding piece 38*h* does not bend. More specifically, for example, the second holding piece 38*h* includes a holding surface plate 38*k* that holds a part of the outer peripheral surface of the wiring material W covered with the corrugated tube C, and a reinforcing piece 38*m* that reinforces the holding surface plate 38*k*. The holding surface plate 38*k* is a plate-shaped member that is curvedly formed along the shape of the outer peripheral surface of the corrugated tube C. The reinforcing piece 38*m* is provided on both ends of the holding surface plate 38*k* in the second width direction Z, and supports the holding surface plate 38*k* from the side opposite from the wiring material W. An end of the reinforcing piece 38*m* at the side opposite from the holding surface plate 38*k* is fixed to the partition board 31*b*. The reinforcing piece 38*m* supports the holding surface plate 38*k* so that the holding surface plate 38*k* does not bend, when the holding surface plate 38*k* is holding the wiring material W.

With the pair of holding pieces 38B configured in this manner, the interval between the tip end portion of the first holding piece 38*g* and the tip end portion of the second holding piece 38*h* is set narrower than the diameter of the wiring material W (initial state). Consequently, with the pair of holding pieces 38B, when the wiring material W is pressed in between the first holding piece 38*g* and the second holding piece 38*h*, the first holding piece 38*g* bends in a direction separating from the second holding piece 38*h*. When the wiring material W is further pressed to the lower semicircular opening portion 31*d*, the first holding piece 38*g* returns to the initial state. As described above, because the reinforcing piece 38*m* is fixed to the partition board 31*b*, the second holding piece 38*h* does not bend even if the wiring material W is pressed in.

The supporting projection rib 39 illustrated in FIG. 4 and FIG. 5 is a projection that supports the pair of holding pieces 38A and 38B. The supporting projection rib 39 is provided inside the casing 3, and for example, is provided inside the side wall surface 33*a* of the upper cover 33. For example, the supporting projection rib 39 includes a first supporting projection rib 39*a* and a second supporting projection rib 39*b*. The first supporting projection rib 39*a* is provided between the upper semicircular opening portion 33*c* and the upper semicircular opening portion 33*d* of the upper cover 33. The second supporting projection rib 39*b* is provided at a side opposite from the first supporting projection rib 39*a* with the upper semicircular opening portion 33*c* interposed therebetween. The first supporting projection rib 39*a* is positioned between the pair of holding pieces 38A and the pair of holding pieces 38B, while the frame 31 and the upper cover 33 are assembled to each other. The first supporting projection rib 39*a* is a plate member facing a wall surface E on which the insertion ports 36 are provided, and projects downward from the ceiling surface 33*b* side in the height direction X. The length of the first supporting projection rib 39*a* in the first width direction Y is the same as that of the interval between the holding surface plate 38*c* and the holding surface plate 38*i*. Both tip end portions of the first supporting projection rib 39*a* in the first width direction Y are formed in a tapered shape so that the first supporting projection rib 39*a* can be easily inserted between the holding surface plate 38*c* and the holding surface plate 38*i*. For example, while the frame 31 and the upper cover 33 are assembled to each other, the first supporting projection rib 39*a* comes into contact with the holding surface plates 38*c* and 38*i* at the side opposite from the wiring material W. In the present embodiment, the first supporting projection rib 39*a* includes a reinforcing rib 39*c* that has a plate shape and that reinforces the first supporting projection rib 39*a*. The reinforcing rib 39*c* extends in the front and rear direction of the first supporting projection rib 39*a* from substantially the center of the first supporting projection rib 39*a*, along the second width direction Z intersecting with (orthogonal to) the first supporting projection rib 39*a*. Both end portions of the reinforcing rib 39*c* in the second width direction Z are fixed to (integrally molded with) the frame portion of the upper cover 33.

The second supporting projection rib 39*b* is positioned facing the holding surface plate 38*e* of the second holding piece 38*b*, while the frame 31 and the upper cover 33 are assembled to each other. The second supporting projection rib 39*b* is a plate member facing the wall surface E on which the insertion ports 36 are provided, and projects downward from the ceiling surface 33b side in the height direction X. One of the ends of the second supporting projection rib 39b in the first width direction Y side is fixed to the frame portion of the upper cover 33. The tip end portion of the other end of the second supporting projection rib 39b in the first width direction Y side is formed in a tapered shape so that the second supporting projection rib 39b can easily come into contact with the holding surface plate 38e. For example, while the frame 31 and the upper cover 33 are assembled to each other, the second supporting projection rib 39b comes into contact with the holding surface plate 38e at the side opposite from the wiring material W. Because the first and second supporting projection ribs 39a and 39b configured in this manner support the holding surface plates 38c, 38e, and 38i at the side opposite from the wiring material W, while the frame 31 and the upper cover 33 are assembled to each other, it is possible to prevent the first holding pieces 38a and 38g, and the second holding piece 38b from bending, even if external force is applied to the wiring material W. Consequently, it is possible to suitably hold the wiring material W.

Figure 6:
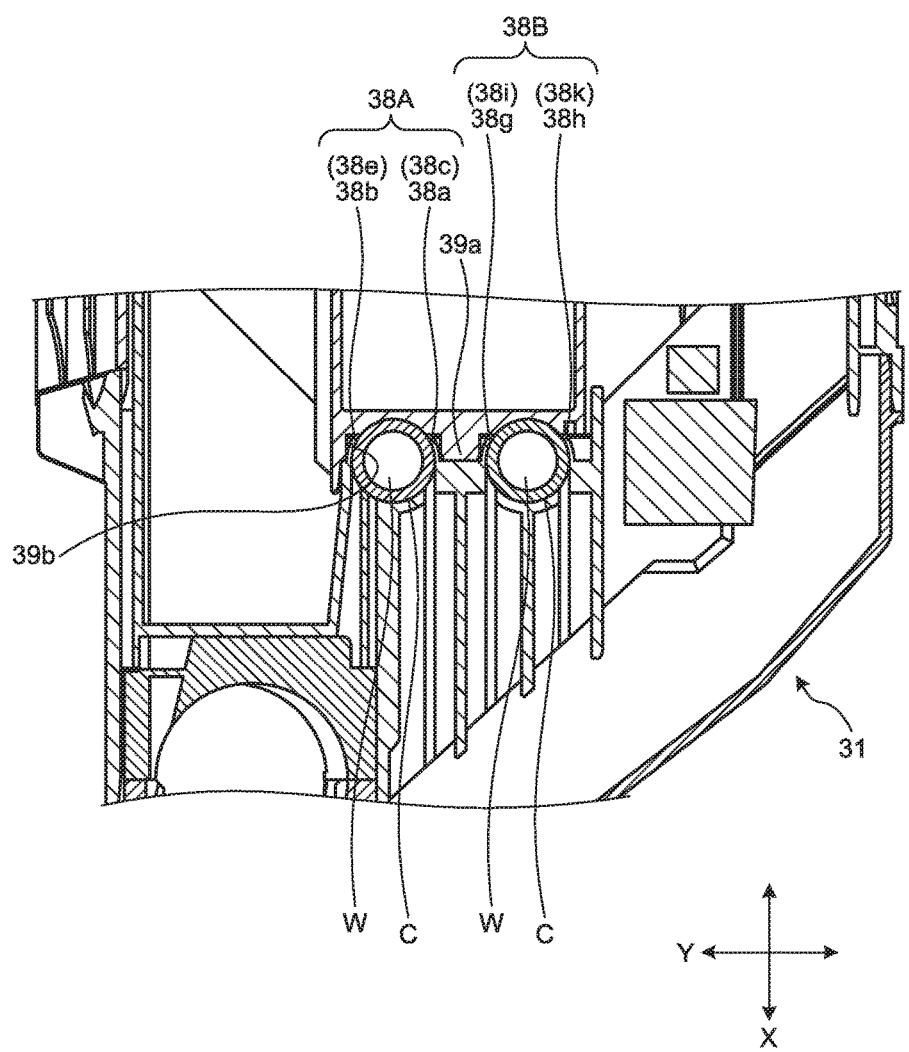
FIG. 6 is a sectional view cut along the line P-P in FIG. 1 illustrating an example of holding a wiring material according to the embodiment.

Next, operational effects of the electrical connection box 1 will be described with reference to FIG. 6. FIG. 6 is a sectional view cut along the line P-P in FIG. 1 illustrating an example of holding the wiring material W according to the embodiment. In the electrical connection box 1, while the upper cover 33 is removed from the frame 31, the wiring material W covered with the corrugated tube C is mounted on the pair of holding pieces 38A. In this process, in the electrical connection box 1, the first holding piece 38a and the second holding piece 38b bend in the direction separating from each other. When the wiring material W is further pressed to the lower semicircular opening portion 31c, the first holding piece 38a and the second holding piece 38b return to the initial state. Moreover, in the electrical connection box 1, the wiring material W covered with the corrugated tube C is mounted on the pair of holding pieces 38B. In this process, in the electrical connection box 1, the first holding piece 38g bends in the direction separating from the second holding piece 38h. When the wiring material W is further pressed to the lower semicircular opening portion 31d, the first holding piece 38g returns to the initial state. Furthermore, in the electrical connection box 1, when the upper cover 33 is assembled to the frame 31 while the pair of holding pieces 38A and 38B are holding the wiring material W, the first supporting projection rib 39a comes into contact with the holding surface plates 38c and 38i at the side opposite from the wiring material W. Still furthermore, in the electrical connection box 1, the second supporting projection rib 39b comes into contact with the holding surface plate 38e at the side opposite from the wiring material W.

In this manner, the electrical connection box 1 and the wire harness WH according to the embodiment are provided with the casing 3 including the frame 31 and the upper cover 33 that are assembled to each other and that define the housing space portion 34; and the insertion port 36 that is formed by opening the boundary edge L of the frame 31 or the upper cover 33 to cause the conductive wiring material W to be inserted through the insertion port. The frame 31 includes the pair of holding pieces 38A and 38B that are provided on both sides of the insertion port 36, the pair of holding pieces 38A and 38B having flexibility in the clipping direction, and clipping and holding the wiring material W. The upper cover 33 includes the supporting projection rib 39 that supports the pair of holding pieces 38A and 38B at the side opposite from the wiring material W, while the frame 31 and the upper cover 33 are assembled to each other. In this manner, while the upper cover 33 is removed from the frame 31, the electrical connection box 1 and the wire harness WH allow the pair of holding pieces 38A and 38B to clip the wiring material W while the wiring material W are being pressed in between the pair of holding pieces 38A and 38B and the pair of holding pieces 38A and 38B are being bent. Then, in the electrical connection box 1 and the wire harness WH, while the frame 31 and the upper cover 33 are assembled to each other, the supporting projection rib 39 supports the pair of holding pieces 38A and 38B from the side opposite from the wiring material W. Consequently, it is possible to prevent the pair of holding pieces 38A and 38B from bending even if the external force is applied to the wiring material W. Hence, in the electrical connection box 1 and the wire harness WH, the pair of holding pieces 38A and 38B can firmly hold the wiring material W from both sides thereof. As a result, the electrical connection box 1 and the wire harness WH can suitably hold the wiring material W.

Moreover, in the electrical connection box 1, the supporting projection rib 39 is a plate member that is provided inside the casing 3, and that faces the wall surface E on which the insertion ports 36 are provided. In this manner, in the electrical connection box 1, the supporting projection rib 39 can block liquid from entering the casing 3 from the boundary between the frame 31 and the upper cover 33. Consequently, the electrical connection box 1 can prevent liquid from entering the casing 3 from the boundary, and improve the water cut-off performance.

Furthermore, the electrical connection box 1 includes the corrugated tube C that covers the wiring material W when the wiring material W is inserted thereinto. The pair of holding pieces 38A and 38B clip and hold the corrugated tube C from both sides thereof. The electrical connection box 1 can be suitably applied to the wiring material W covered with the corrugated tube C.

Modification

Next, a modification of the embodiment will be described. An example of providing the pair of holding pieces 38A and 38B, and the supporting projection rib 39 at the insertion port 36 that is configured by the frame 31 and the upper cover 33 has been described. However, it is not limited thereto. The pair of holding pieces 38A and 38B, and the supporting projection rib 39 may also be provided at the insertion port 36 that is configured by the frame 31 and the lower cover 32. The pair of holding pieces 38A and 38B, and the supporting projection rib 39 may also be provided at the insertion port 36 that is configured by the first frame and the second frame, which are not illustrated.

Moreover, in the example, the insertion opening portion that has a substantially circular shape and that is formed by opening both the boundary edges L of the frame 31 and the upper cover 33, is formed on the insertion port 36. However, it is not limited thereto. The insertion opening portion that has a substantially circular shape, and that is formed by opening the boundary edge L on one of the frame 31 or the upper cover 33 may also be formed on the insertion port 36.

Furthermore, the shape of the pair of holding pieces 38A and 38B is not limited to the above, as long as the pair of holding pieces 38A and 38B have flexibility and are capable of clipping and holding the wiring material W from both sides thereof.

Still furthermore, the shape of the supporting projection rib 39 is not limited to the above, as long as the supporting projection rib 39 can support the pair of the holding pieces 38A and 38B at the side opposite from the wiring material W.

Still furthermore, in the example, the length of the first supporting projection rib 39a in the first width direction Y is the same as that of the interval between the holding surface plate 38c and the holding surface plate 38i. However, it is not limited thereto. The length of the first supporting projection rib 39a in the first width direction Y may also be longer than the interval between the holding surface plate 38c and the holding surface plate 38i. In this case, with the first supporting projection rib 39a, the holding surface plates 38c and 38i are pressed toward the wiring material W side, while the frame 31 and the upper cover 33 are assembled to each other. Consequently, the first supporting projection rib 39a can firmly hold the wiring material W furthermore. Similarly, with the second supporting projection rib 39b, the holding surface plate 38e may be pressed toward the wiring material W side, while the frame 31 and the upper cover 33 are assembled to each other.

In the electrical connection box and the wire harness according to the present embodiment, one of the first member or the second member includes the pair of holding pieces that have flexibility in the clipping direction, and that clip and hold the wiring material; and another of the first member or the second member includes the supporting projection part that supports the pair of holding pieces at the side opposite from the wiring material, while the first member and the second member are assembled to each other. In this manner, while the first member and the second member are not assembled to each other, the electrical connection box and the wire harness allow the pair of holding pieces to clip the wiring material while the pair of holding pieces are bent. Moreover, in the electrical connection box and the wire harness, while the first member and the second member are assembled to each other, the supporting projection part supports the pair of holding pieces from the side opposite from the wiring material. Consequently, it is possible to prevent the pair of holding pieces from bending even if the external force is applied to the wiring material. As a result, the electrical connection box and the wire harness can suitably hold the wiring material.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box, comprising:
   a casing that includes:
      a first member and a second member that are assembled to each other and that define an internal space; and
      an insertion port formed by opening a boundary edge of at least one of the first member and the second member to cause a wiring material having conductivity to be inserted through the insertion port, wherein
   one of the first member and the second member includes a pair of holding pieces that are provided on both sides of the insertion port, the pair of holding pieces having flexibility in a clipping direction, and clipping and holding the wiring material, and
   the other of the first member and the second member includes a supporting projection part that supports the pair of holding pieces at a side opposite from the wiring material, while the first member and the second member are assembled to each other.

2. The electrical connection box according to claim 1, wherein
   the supporting projection part is a plate member that is provided inside the casing and that faces a wall surface on which the insertion port is provided.

3. The electrical connection box according to claim 1, further comprising:
   a covering material that covers the wiring material when the wiring material is inserted into the covering material, wherein
   the pair of holding pieces clip and hold the covering material from both sides thereof.

4. The electrical connection box according to claim 2, further comprising:
   a covering material that covers the wiring material when the wiring material is inserted into the covering material, wherein
   the pair of holding pieces clip and hold the covering material from both sides thereof.

5. A wire harness, comprising:
   a wiring material that is conductive; and
   an electrical connection box electrically connected to the wiring material, wherein
   the electrical connection box includes a casing including a first member and a second member that are assembled to each other and that define an internal space, and an insertion port that is formed by opening at least one of a boundary edge of the first member and the second member to cause a wiring material that is conductive to be inserted through the insertion port,
   one of the first member and the second member includes a pair of holding pieces that are provided on both sides of the insertion port, the pair of holding pieces having flexibility in a clipping direction, and clipping and holding the wiring material, and
   the other of the first member and the second member includes a supporting projection part that supports the pair of holding pieces at a side opposite from the wiring material, while the first member and the second member are assemble to each other.

* * * * *